United States Patent
MacIntosh et al.

(10) Patent No.: US 8,036,723 B2
(45) Date of Patent: *Oct. 11, 2011

(54) KEYPAD AND MICROPHONE ARRANGEMENT

(75) Inventors: Scott MacIntosh, Kitchener (CA); Teodor Dabov, Toronto (CA); Larry Hawker, Waterloo (CA); Felipe Simoes, Kitchener (CA)

(73) Assignee: Research in Motion Limited, Waterloo, Ontario (CA)

( * ) Notice: Subject to any disclaimer, the term of this patent is extended or adjusted under 35 U.S.C. 154(b) by 446 days.

This patent is subject to a terminal disclaimer.

(21) Appl. No.: 12/016,364

(22) Filed: Jan. 18, 2008

(65) Prior Publication Data

US 2008/0125194 A1   May 29, 2008

Related U.S. Application Data

(63) Continuation of application No. 10/855,401, filed on May 28, 2004, now Pat. No. 7,349,723.

(51) Int. Cl.
  *H04M 1/00* (2006.01)
  *H04M 9/00* (2006.01)

(52) U.S. Cl. ............... 455/575.1; 455/550.1; 455/575.8; 379/433.01; 379/433.02; 379/433.03; 379/437; 379/428.01

(58) Field of Classification Search ............... 455/575.1, 455/550.1, 575.8; 379/433.02, 433.01, 433.03, 379/437, 428.01
See application file for complete search history.

(56) References Cited

U.S. PATENT DOCUMENTS

| | | | |
|---|---|---|---|
| 4,081,631 A * | 3/1978 | Feder | 200/5 A |
| 5,265,274 A * | 11/1993 | Knutson et al. | 455/347 |
| 5,768,369 A | 6/1998 | Zoiss et al. | |
| 6,052,464 A | 4/2000 | Harris et al. | |
| 6,137,883 A * | 10/2000 | Kaschke et al. | 379/433.07 |
| 6,322,229 B1 * | 11/2001 | Chan et al. | 362/85 |
| 7,590,234 B2 * | 9/2009 | Burnette et al. | 379/433.07 |
| 2002/0002059 A1 | 1/2002 | Johnson | |
| 2003/0006402 A1 * | 1/2003 | Rao et al. | 252/500 |
| 2003/0223610 A1 | 12/2003 | Tanemura et al. | |

FOREIGN PATENT DOCUMENTS

| | | |
|---|---|---|
| EP | 0 871 313 A1 | 10/1998 |
| FR | 2 686 756 A1 | 7/1993 |
| JP | 8065367 | 3/1996 |
| JP | 2003 333142 | 11/2003 |
| WO | WO 00/30257 A1 | 5/2000 |

* cited by examiner

*Primary Examiner* — George Eng
*Assistant Examiner* — Wesley L Kim
(74) *Attorney, Agent, or Firm* — McCarthy Tétrault LLP

(57) ABSTRACT

Disclosed is a keypad and microphone arrangement for a communication device. The arrangement comprises: a key having a cap portion and a stem portion; a base layer attached to the stem portion; a key circuit to recognize activation of the key; a support member to support the key and base layer; a microphone located beneath the support member; a port in the base layer extending from an upper surface of the base, through an interior of the base layer, to a lower surface of the base layer. The support member has an opening extending from its top surface, through its interior, to its bottom surface. There is also an air channel connecting the microphone to ambient air above the cap portion, the air channel comprising the port and the opening. The stem portion and the cap portion are located about the port such that the cap portion extends fully over the port. The arrangement may be used in any communication device having voice reception capabilities.

11 Claims, 5 Drawing Sheets

KEYPAD AND MICROPHONE ARRANGEMENT

This application is a U.S. continuation application of U.S. patent application Ser. No. 10/855,401 filed on May 28, 2004, now U.S. Pat. No. 7,349,723.

FIELD OF INVENTION

The invention relates to a microphone arrangement for a voice communication device, in particular an arrangement relating to a layout of a microphone and a keypad.

BACKGROUND

In a voice communication device, a microphone and a speaker must be provided in order to allow a user to send and receive audio signals with another compatible device used by another person.

In a typical telephone, a handset is provided which is a shaped form having a microphone and a speaker positioned in a spaced relationship. Typically, both the microphone and the speaker are placed behind a series of ports to allow transmission of sounds to and from them to outside the handset. These ports provide benefits for the acoustic frequency response characteristics of the handset, but can be aesthetically distracting to the appearance of the handset. Further having exposed ports leaves the ports susceptible to blockage from ambient dust or dirt. Liquids spilled around the ports may also enter the port and may damage the devices underneath.

Meanwhile, portable communication devices, such as cellular phones, have smaller and smaller form factors. Positioning transducers for a cellular phone having a small form factor is a difficult task, because there is little area to place a port for a transducer.

There is a need for an arrangement which addresses deficiencies in the prior art of locating a transducer for a communication device.

SUMMARY

In a first aspect, a keypad and microphone arrangement for a communication device is provided. The arrangement comprises: a key having a cap portion and a stem portion; a base layer attached to the stem portion; a key circuit to recognize activation of the key; a support member to support the key and base layer; a microphone located beneath the support member; a port in the base layer extending from an upper surface of the base, through an interior of the base layer, to a lower surface of the base layer. The support member has an opening extending from its top surface, through its interior, to its bottom surface. There is also an air channel connecting the microphone to ambient air above the cap portion, the air channel comprising the port and the opening. The stem portion and the cap portion are located about the port such that the cap portion extends fully over the port.

In the arrangement, the key circuit may be located beneath the base layer. The key circuit may be mounted on a PCB. The PCB may have a second opening from its top surface through its interior to its bottom surface. Also, the arrangement may have: a second PCB for mounting the microphone thereon; and a support for the key circuit mounted to the second PCB and being located below the key circuit. The support may have a third opening from its top surface, through its interior to its bottom surface. The air channel further comprises the second and third openings.

In the arrangement, the air channel may extend vertically from the microphone to the port in a column.

In the arrangement, an opening for the port in the top surface of the base layer may be located about a corner of the stem.

In the arrangement, the stem may have an inward notch in its body in the corner of the stem portion.

In the arrangement, the microphone may be enclosed in a Faraday shield about the PCB.

In a second aspect, a wireless communication device is provided. The device comprises: an exterior frame; an antenna for transmitting wireless signals; a key having a cap and a stem; a base layer attached to the stem; a support member to support the keypad and the base layer; a key circuit to recognize activation of the key; a microphone located beneath the support member; a port in the base layer extending from an upper surface of the base, through an interior of the base layer, to a lower surface of the base layer; and an air channel connecting the microphone to ambient air above the cap, the air channel comprising the port and an opening in the support member extending from its top surface, through its interior, to its bottom surface. In the device, the stem and the cap are located about the port such that the cap extends fully over the port.

In the device, the key circuit may be located beneath the base and the key circuit may be mounted on a PCB. The PCB has a second opening from its top surface through its interior to its bottom surface. Also, the device further comprises: a second PCB for mounting the microphone thereon; and a support for the key circuit mounted to the second PCB. The support is located below the key circuit and has a third opening from its top surface, through its interior to its bottom surface. Further, the air channel comprises the second and third openings.

In the device, the air channel may extend vertically from the microphone to the port in a column.

In the device, an opening of the port in the top surface of the base layer may be located about a corner of the stem.

In the device, the microphone may be enclosed in a Faraday shield on the second PCB.

In a third aspect, a wireless handheld communication device is provided. It comprises: a housing having a front face; a display located proximately to a first end of the front face; a keypad located proximately to a second end of the front face, the second end being substantially opposite to the first end, the keypad having a plurality of keys allowing the entry of alphanumeric text to create textual messages to be wirelessly transmitted from the wireless handheld communications device; and a microphone for receiving voice, the microphone being located under the keypad with respect to a user's face. In the device the keypad has at least one audio input port that is located underneath a key of the keypad.

In the device, wherein the key of the keypad under which is the at least one audio input port may redirect air flow to the at least one audio input port.

In the device, air flow may be redirected in a substantially perpendicular manner.

In a fourth aspect, a wireless handheld communications device is provided. It comprises: a housing having a front face; a display located proximately to a first end of the front face; a keypad located proximately to a second end of the front face, the second end being substantially opposite to the first end, the keypad having a plurality of keys allowing the entry of characters, the entry of characters being used in wireless communications from the wireless handheld communications device; and a microphone for receiving voice, the microphone being located under the keypad with respect to a user's face. In the device, the keypad has at least one audio input port that is located underneath a key of the keypad.

In a fifth aspect, a wireless handheld communications device is provided. The device comprises: a housing having a front face; a display located near a first end of the front face; a keypad located proximately to a second end of the front face, the second end opposing the first end along a length of the front face, the keypad allowing an entry of characters; and a microphone located underneath the keypad. With the device, a user may select a text message mode of the wireless handheld communications device.

In other aspects various combinations of sets and subsets of the above aspects are provided.

BRIEF DESCRIPTION OF DRAWINGS

The foregoing and other aspects of the invention will become more apparent from the following description of specific embodiments thereof and the accompanying drawings which illustrate, by way of example only, the principles of the invention. In the drawings, where like elements feature like reference numerals (and wherein individual elements bear unique alphabetical suffixes).

DETAILED DESCRIPTION OF AN EMBODIMENT

Figure 1:
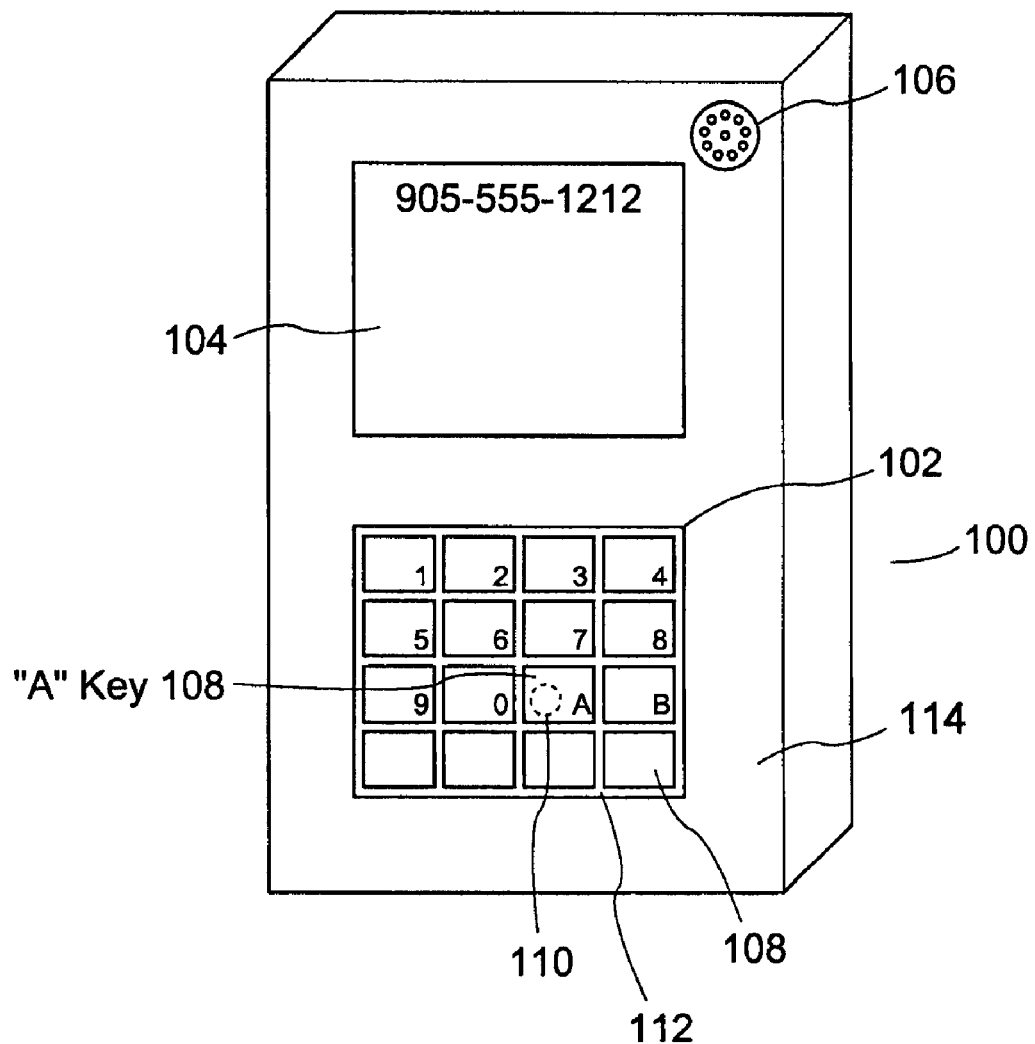
FIG. 1 is a diagram of a communication device having a keypad and a microphone according to an embodiment of the invention.

The description which follows, and the embodiments described therein, are provided by way of illustration of an example, or examples, of particular embodiments of the principles of the present invention. These examples are provided for the purposes of explanation, and not limitation, of those principles and of the invention. In the description, which follows, like parts are marked throughout the specification and the drawings with the same respective reference numerals.

Referring to FIG. 1, communication device 100 is shown. Communication device 100 is preferably a wireless communication device such as a cellular phone, a personal digital assistant (PDA) or a wireless device providing voice and data transmission capabilities (such as text messaging or email capabilities). Communication device 100 has wireless transmission of voice capabilities, as provided by cellular communication devices known in the art. However, device 100 may also be a telephone, a cordless telephone, a handset for a telephone or any device providing voice communications. The main user interface elements of communication device 100 for its user are keypad 102, display 104 and speaker 106.

It will be appreciated that the layout of keys 108 within keypad 102 may be numeric, alphabetic, symbolic, alphanumeric or a combination of any of the above. It will also be appreciated that alphabetic keys may be arranged in the standard typist "QWERTY"-layout keyboard, a sequential layout or any other layout.

When a user activates communication device 100 to initiate a call, he enters a called telephone number via pressing appropriate keys 108 on keypad 102. As each key 108 is pressed, display 104 presents the called telephone number as it is built. Upon connection of the call to the called telephone number, the user typically orients it such that speaker 106 is located near his ear and keypad 102 is located near his mouth. Behind the "A" key 108A is port 110. Port 110 forms part of an air channel to the interior of communication device 100. At the end of the air channel, a microphone is located (not shown) which is a transducer to convert the audible energy in the user's spoken words to an electrical signal. Keys 108 are arranged in a spaced relationship such that there is an air gap 112 between sides of adjacent keys 108 to facilitate individual activation of keys 108. Device 100 is housed in casing 114.

Port 110 is located underneath "A" key 108A. As such, port 110 is hidden from sight from the user. "A" key 108 and its immediately adjacent keys 108 provide a physical barrier to impede foreign elements, such as dust and dirt from covering port 110, which would attenuate the audio signals actually received by the microphone. As such, communication device 100 has a clean aesthetic appearance as port 110 is hidden when viewed from above. It will be appreciated in another embodiment, a corresponding port to port 110 may be located underneath a different key 108.

Figure 2:
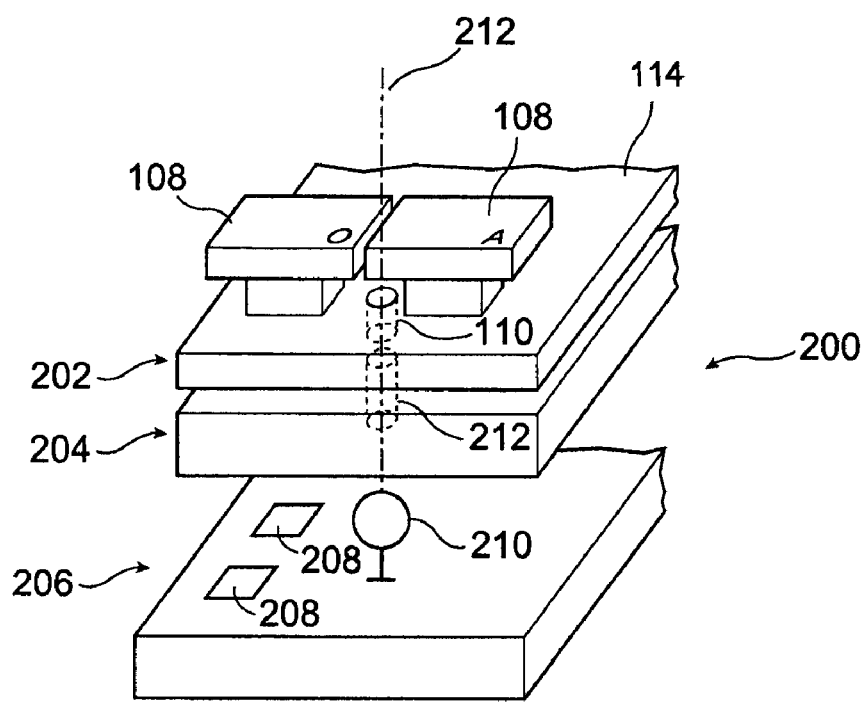
FIG. 2 is an exploded perspective view of aspects of the keypad and the microphone of the device of FIG. 1.

Referring to FIG. 2, further detail on aspects of keypad 108 vis-à-vis the microphone are provided. Therein, exploded view 200 provides an exploded view of internal elements of communication device 100. There are three main layers of internal elements: external layer 202; keypad layer 204; and PCB 206. External layer 202 comprises external components exposed to the ambient environment about casing 114. Keypad layer 204 is aligned to be located underneath external layer 202 and provides an electro-mechanical circuit to generate an electrical signal from activation of any key 108 for use by internal circuitry of device 100. PCB 206 is located underneath keypad layer 204 and provides a substrate for supporting internal circuitry for device 100. The internal circuits include electronic components 208, such as central processing units, radio frequency components, memory units, battery supplies, and microphone 210. Embedded on PCB 206 are electrically-conductive tracks to make circuits for components 208.

Microphone 210 preferably has a channel providing air access to the exterior of device 100 to function effectively. In the embodiment, a space-efficient channel is provided, wherein microphone is vertically aligned with port 110. The channel is defined by a series of openings in each of the three layers. In external layer 202, port 110 extends from its upper surface through its interior to its bottom surface in a preferably cylindrical channel. Keypad layer 204 has port 212 which extends from its top through its interior to its bottom. The upper opening of port 212 is aligned with the bottom opening of port 110. Microphone 210 is preferably located to be directly underneath port 212. As such, the air channel is defined by port 110 and port 212. In other embodiments, a different number of internal ports may be present, placing their microphone either closer to, or further away from, port 110. Additional acoustic insulators may also be provided between interface areas between ports and between a port and microphone 210.

Figure 3:
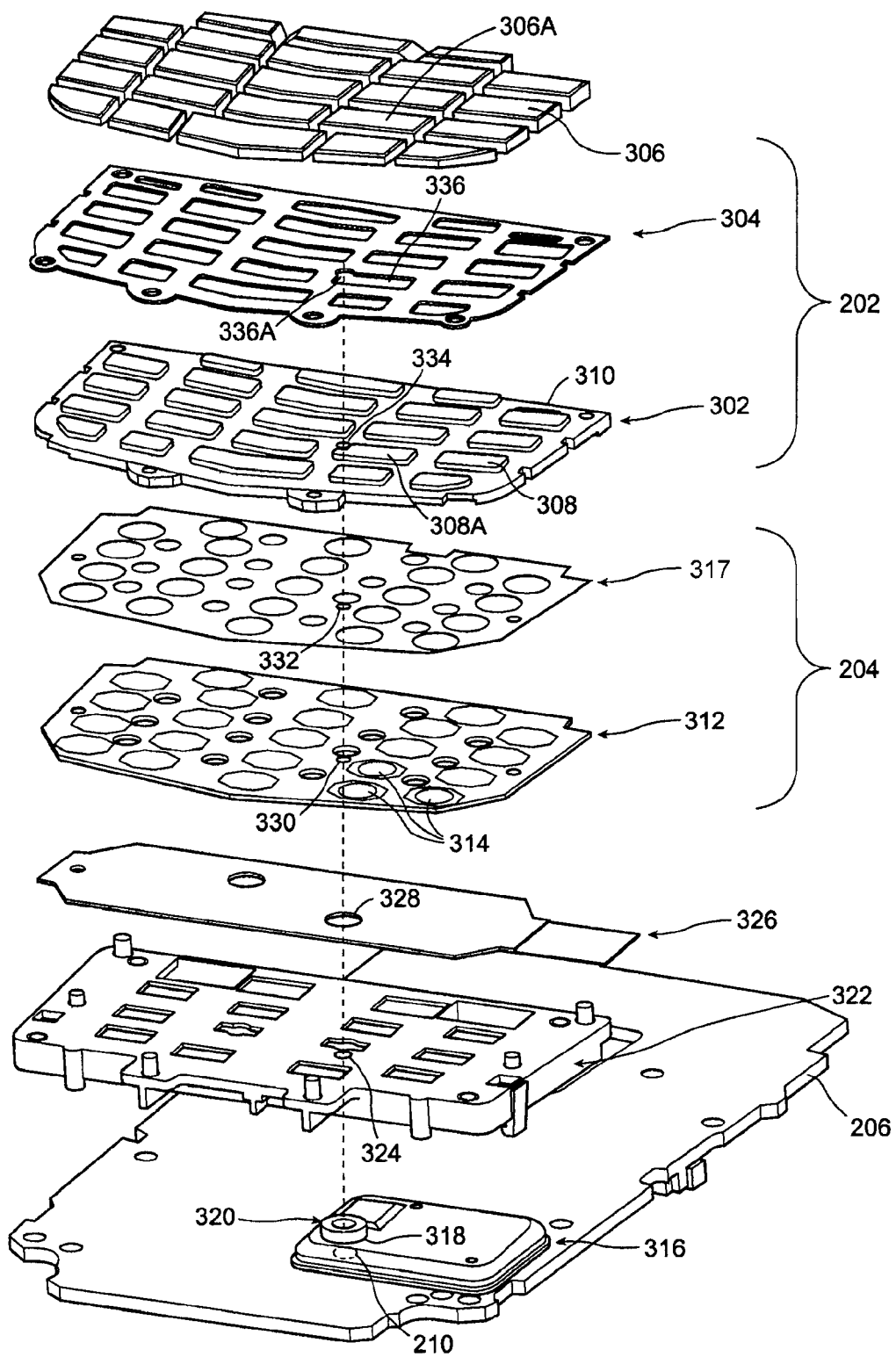
FIG. 3 is an exploded perspective view of components of the communication device, the keypad and the microphone of FIG. 1.

Referring to FIG. 3, further detail is provided on internal elements of device 100 in view 300. External layer 202 comprises base section 302, frame 304 and caps 306. Base section 302 is a silicon-based elastomer formed as a plurality of stems 308 having webbing 310 therebetween to connect bases of stems 308 together. In other embodiments, some or every stem 308 may not be connected together by webbing 310. Each key 108 is comprised of two portions: a cap 306 and a stem 308. Cap 306 is fused to its associated stem 308 by an adhesive. Other bonding techniques, such as sonic welding, may also be used. Stem 308 is a support for cap 306. Pressing on cap 306 causes its stem 308 to be pushed downward to engage an electrical contact for a circuit in keypad layer 204. Further detail on this engagement is provided below. In the embodiment, stem 308 is a solid rectangular shape. However, any volume shape which will support cap 306 and engage the electrical contact will also be suitable. Frame 304 provides a top cover for base section 302 and also provides structural rigidity to keypad 102. As such, frame 304 is preferably made from a sufficiently stiff material, such as a stamped piece of metal or a moulded piece of hard plastic.

Keypad layer 204 comprises keypad PCB 312, a plurality of domes 314 and keypad dome sheet 317. For each key 108, keypad PCB 312 has an electrical circuit located immediately underneath it. The electrical circuit has a first section and a second section in a spaced relationship. Dome 314 sits above the first and second sections for each key 108. Dome 314 is generally a thin, convex, compressible, electrically conductive element. All of domes 314 are held in place by dome sheet 317, which has an adhesive side on it lower surface and a non-adhesive polished side on its upper surface. When key 108 is depressed, stem 308 is moved downward and a bottom portion of stem 308 contacts dome 314 to force it downward. Compression of dome 314 causes it to make contact with the first and second sections of keypad PCB 312 simultaneously, thereby completing an electrical contact between the sections. Circuitry of keypad PCB 312 then recognizes the completion of the contact and appropriate signals are provided to other circuits therein. Upon release of key 108, dome 314 flexes upward, returns to its uncompressed shape and causes key 108 to move upward to its original, unpressed position. Such circuits and elements for making an electrical connection for a key in a keypad, such as key 108, are known in the art.

PCB 206 has microphone 210 mounted onto it within shield can 316. Shield can 316 provides a Faraday shield to isolate microphone 210 from electromagnetic interference. Such interference may originate from signals received and generated by an antenna (not shown) provided for device 100. Shield can 316 has aperture 318 therein to allow sounds entering port 110 to ultimately enter shield can 316 and be exposed to microphone 210 Shield can 316 is preferably made of metal and is shaped to completely enclose microphone 210, but for aperture 318, when microphone 210 is mounted onto PCB 206. Shield can 316 is oblong in shape, but any suitable shape may be used. Alternate embodiments may dispense with having a shield can.

Gasket 320 is an annular ring and is dimensioned to fit within aperture 318 and is comprised of a compressible material. In the embodiment, it is compressible by approximately 40%. Gasket 320 is positioned such that its lower end rests against microphone 210 and its upper end extends towards the bottom surface of keypad support 332. Other materials may be used if other compression characteristics are required. Alternate embodiments may dispense with having a gasket.

Keypad support 322 provides a raised bracket for PCB 206 to locate keypad layer 202 at an appropriate height in casing 114, while allowing components 208 to be located on PCB 206 underneath it. In situ, sides of keypad support rest on the surface of PCB 206 and snap tabs in the sides engage with the bottom of PCB 206 to snugly secure keypad support 322 to PCB 206. As such, keypad support 322 also provides a brace for keypad 108 as keys 108 are pressed. Aperture 324 in keypad support 322 provides an opening to continue the air channel from port 110 to microphone 210 and is vertically aligned with aperture 318 and the interior of gasket 320. When keypad support 322 is secured to PCB 206, gasket 320 is compressed, but it still maintains an internal cavity, thereby defining an acoustic channel for sound to travel through opening 324 in keypad support 322 directly to microphone 210.

To adhere keypad layer 204 to elements associated with PCB 206, double-sided adhesive tape 326 is provided. The bottom of keypad PCB 312 is affixed to the top of keypad support 322 by adhesive tape 326. Opening 328 in adhesive tape 326 allows the air channel to be maintained from microphone 210 through keypad support 322 through adhesive tape 326 to keypad layer 204.

Continuing with the air channel, in keypad layer 204, port 212 is defined by opening 330 in keypad PCB 312 and opening 332 in dome sheet 317. In base section 302, opening 334 is provided for the air channel and aligns with opening 332. In frame 304, opening 336 has section 336A which aligns with opening 334.

Figure 4:
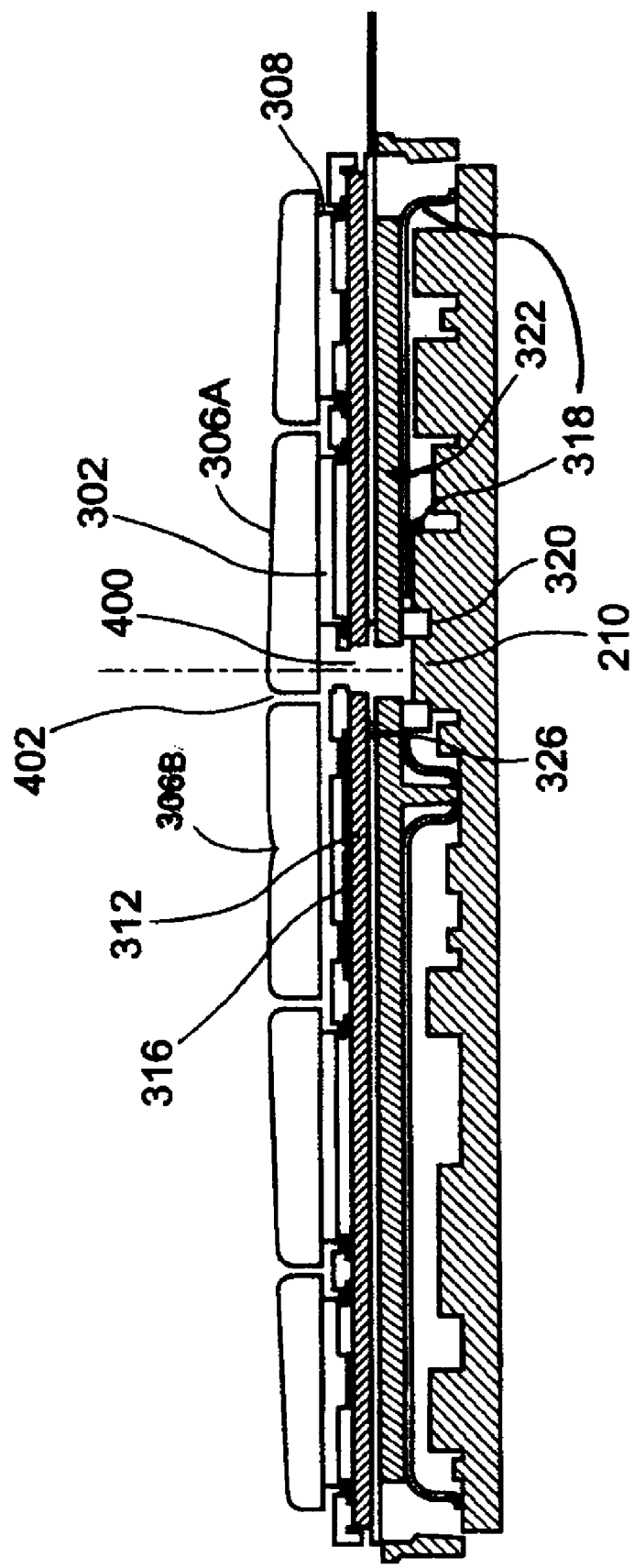
FIG. 4 is a cross-sectional view of selected components of the communication device, the keypad and the microphone of FIG. 3.

Referring to FIG. 4, elements of FIG. 3 are shown in cross section providing a different view of the air channel. Therein, air channel 400 is comprised of a channel formed by ports 110 and 212, openings 336A, 334, 332, 330, 328 and 324 and gasket to provide access to microphone 210. It will be appreciated that in other embodiments, the air channel may have a different volume, a different cross section and a different location relative to the location of microphone 210. In other embodiments, there may be multiple air channels and a series of air channels may be provided to connect a series of ports to the microphone. Therein, some of the ports, if not all of the ports, may be hidden by one or more keys and their covers. As seen, when key 108 is fully engaged, preferably there is still a gap between the bottom of cap 306A and frame 304, such that port 110 is not physically sealed by the bottom of cap 306A. However, in other embodiments, cap 306A may temporarily seal port 110 when key 108 is fully engaged, as long as the seal is broken upon release of key 108.

Air channel 400 is completed by space 402, located between caps 306A and 306B, to ambient air. While air channel 400 is complete, port 110 is obscured from view by cap 306A and its adjacent cap 306 located to the left of cap 306A. It will be appreciated that in other embodiments, cap 306A may in further laterally extend across port 110 to provide a different degree of obscuring when viewed from above.

Figure 5:
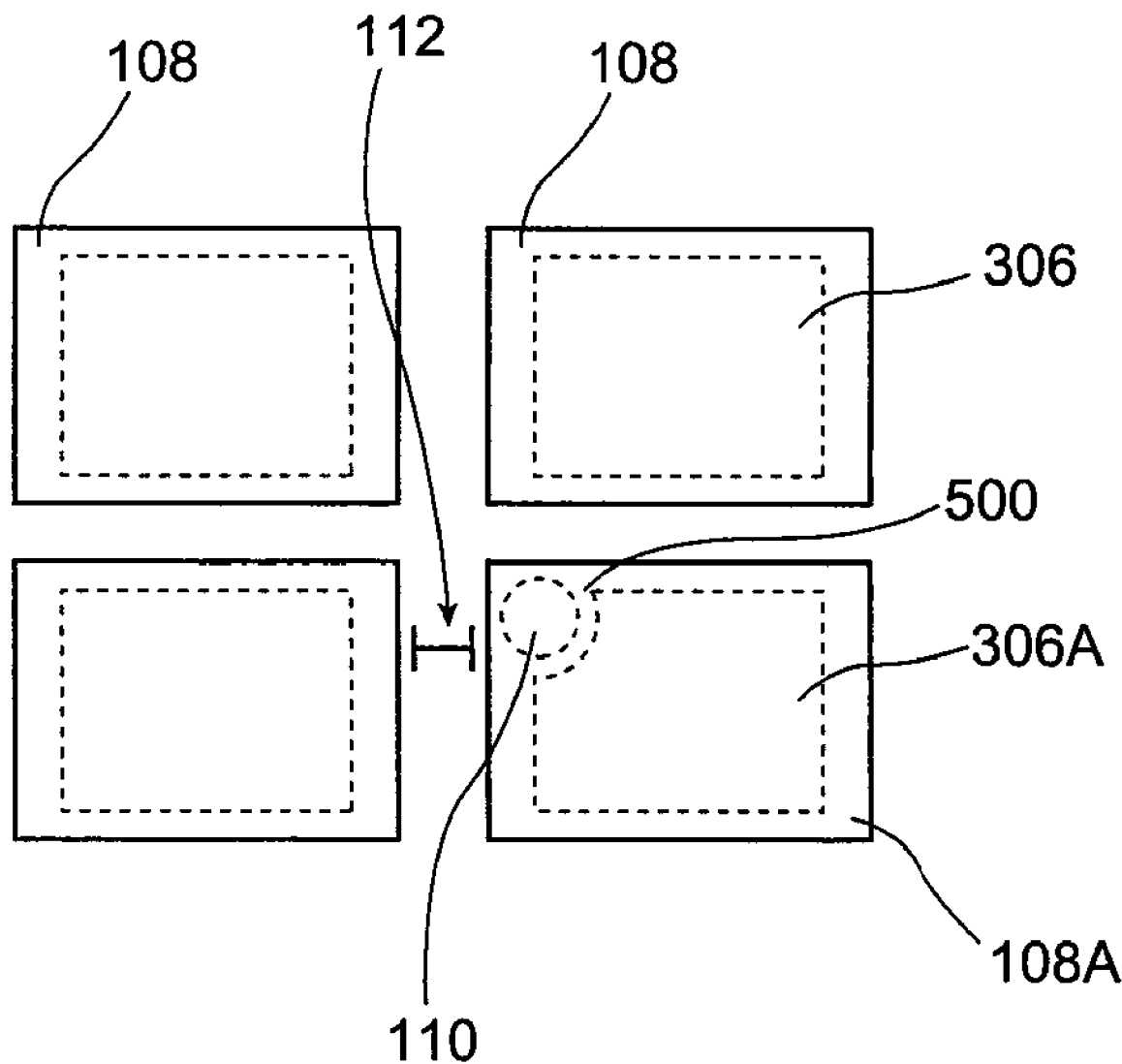
FIG. 5 is a top view of a section of the keypad of FIG. 1.

Referring to FIG. 5, a selection of keys 108 in keypad 102 are shown. "A" key 108A is located amongst neighbouring keys 108. Caps 306 of keys 108 are made of a polycarbonate material, although other materials known in the art of keypads may be used. Each of caps 306 is shown as a having a quadrilateral cross-section, however, any shape of cap 306 would also work in other embodiments. Such shapes include ovoid, rectangular and a general polygon. Port 110 is mostly, if not fully, obscured from view from above by cap 306A. Caps immediately to the left, above and diagonally to the left and above cap 306A assist in obscuring port 110, when viewed from different angles from above. Gaps 112 provide spacing between keys 108. In other embodiments, no gap 112 is provided. Therein, acoustic energy must reach port 110 by entering from the ambient environment to an exterior edge of keypad 102 then travelling through a gap defined by the bottom surface of caps 306, the top of frame 204 and the sides of stems 308 to reach port 110.

Each key is preferably painted with its associated symbol. Accordingly, "A" key 108 is painted with an "A" symbol on it. However, keys may also be silk screened, impressed with, embossed upon, its associated symbol(s). Painting or silk screening key 108 also obscures port 110 from sight when keypad 102 is viewed from above. In other embodiments, keys 108 may be covered with a semi-opaque paint. Alternatively, a substrate used to manufacture cap 306 may be sufficiently opaque to obscure port 110.

Underneath each key 108 the outline of its associated stem 308 is shown. Keys 108 which are not associated with port 110 generally have rectangular-shaped footprints for their respective stems 308. However, "A" key 108 is used to obscure port 110. As such, the shape of stem 308A is adjusted to allow placement of port 110 underneath cap 306A. In particular, in the upper left corner of the footprint of stem 308A, internal notch 500 is provided, which is excised from stem 308A. Notch 500 provides more room around port 110. Opening 336 in frame 304 is made to be slightly larger than the exterior dimension of port 110. Alternative embodiments may have port 110 more fully, if not completely, enclosed within the footprint of stem 308A. Alternative embodiments do not use a notch, when the dimensions of its cap 306, stem 208, port 110 and location of port 110 are arranged to sufficiently obscure sight of its port 110 from above.

In other embodiments, the external port for the enclosed transducer may be obscured from sight by a non-functional key or a decorative cover providing a raised cover to the external port.

In still other embodiments, the air channel and port may be integrated into at least a part of the key obscuring the port. For example, the air channel may be integrated into the stem of a key and the port may be on a side of the stem. Alternatively, the air channel may pass entirely through the stem and the cap, with the port being an opening on a surface of the cap, such as its top, side or exposed underside. In other embodiments, one or more caps or stems near the port may have cut-in channels therein, to provide additional alternative path (s) for sound energy to access the port.

It will be appreciated that the embodiment permits arrangement of an antenna, microphone 210 and keypad 102 in device 100 to be in close proximity to each other.

While aspects of the embodiment have been associated with a communication device, it will be appreciated that in other further embodiments, the keypad and microphone arrangement described herein may be applied to any device having a microphone and a keypad. For example, one such device is a device having a media play back component (such as a CD player) with (audio) recording capabilities.

Although the invention has been described with reference to certain specific embodiments, various modifications thereof will be apparent to those skilled in the art without departing from the scope of the invention as outlined in the claims appended hereto.

The invention claimed is:

1. A keypad and microphone arrangement for a communication device, said arrangement comprising:
a key comprising a cap portion and a stem portion;
a base layer supporting said key, said base layer being attached to a bottom part of said stem portion;
a microphone located below said keypad;
a port connecting said microphone to ambient air above said base layer, said port having a first opening extending from a top side to a bottom side of said base layer;
a key circuit to recognize activation of said key, said key circuit located beneath said base layer and mounted on a first printed circuit board (PCB), said first PCB having a second opening from its to surface through its interior to its bottom surface;
a second PCB for mounting said microphone thereon; and
a support member for said key circuit mounted to said second PCB and located below said key circuit, said support member having a third opening from its top surface, through its interior to its bottom surface,
wherein
said cap portion extends fully over said first opening of said port on said top side; and
an air channel is defined from said microphone to said port on said top side of said base layer, said air channel comprising said first opening, said second opening and said third opening.

2. The keypad and microphone arrangement for a communication device as claimed in claim 1, wherein said support member is located above said microphone.

3. The keypad and microphone arrangement for a communication device as claimed in claim 2, wherein said air channel extends vertically from said microphone to said port in a column.

4. The keypad and microphone arrangement for a communication device as claimed in claim 1, wherein said first opening of said port in said top surface of said base layer is located under a corner of said cap.

5. The keypad and microphone arrangement for a communication device as claimed in claim 1, wherein said stem has an inward notch in its body adjacent to said corner of said cap.

6. The keypad and microphone arrangement for a communication device as claimed in claim 1, wherein said microphone is enclosed in a Faraday shield mounted on said first PCB.

7. The keypad and microphone arrangement for a communication device as claimed in claim 1, wherein:
said base layer is made from a silicon polymer; and
said cap is made from polycarbonate.

8. The keypad and microphone arrangement for a communication device as claimed in claim 1, further comprising a keypad frame placed on top of said base layer.

9. The keypad and microphone arrangement for a communication device as claimed in claim 1, further comprising adhesive tape to secure said first PCB to said support member.

10. The keypad and microphone arrangement for a communication device as claimed in claim 1, further comprising a Faraday shield on said second PCB to enclose said microphone.

11. The keypad and microphone arrangement for a communication device as claimed in claim 10, further comprising an acoustic gasket located between said Faraday shield and said support member.

* * * * *